United States Patent
Tulloch

(10) Patent No.: US 12,372,112 B2
(45) Date of Patent: Jul. 29, 2025

(54) BARREL NUT POSITIONING FRAME

(71) Applicant: AIRBUS OPERATIONS LIMITED, Bristol (GB)

(72) Inventor: William Tulloch, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 182 days.

(21) Appl. No.: 18/079,356

(22) Filed: Dec. 12, 2022

(65) Prior Publication Data

US 2023/0184284 A1  Jun. 15, 2023

(30) Foreign Application Priority Data

Dec. 13, 2021 (GB) ........................................ 2118004

(51) Int. Cl.
*F16B 37/04* (2006.01)
*F16B 39/24* (2006.01)

(52) U.S. Cl.
CPC ............ *F16B 37/047* (2013.01); *F16B 39/24* (2013.01)

(58) Field of Classification Search
CPC ............................. F16B 37/047; F16B 37/046
USPC .......................................................... 411/104
See application file for complete search history.

(56) References Cited

U.S. PATENT DOCUMENTS

| | | | | |
|---|---|---|---|---|
| 2,809,686 A | * | 10/1957 | Shepherd | F16B 37/047 411/970 |
| 2,825,379 A | * | 9/1958 | Becker | F16B 5/0291 411/970 |
| 2,903,035 A | * | 9/1959 | Davenport | F16B 37/047 411/970 |
| 2,920,672 A | * | 1/1960 | Bronson | F16B 39/34 411/104 |
| 3,192,981 A | * | 7/1965 | Le Roy Oliver | F16B 37/047 411/176 |
| 3,192,982 A | * | 7/1965 | Rohe | F16B 37/047 411/970 |
| 4,068,958 A | * | 1/1978 | Beckershoff | F16B 37/047 403/384 |
| 4,886,407 A | * | 12/1989 | Harbin | F16B 37/047 411/970 |
| 5,032,047 A | | 7/1991 | Theakston | |

FOREIGN PATENT DOCUMENTS

GB  2593687  10/2021

OTHER PUBLICATIONS

Combined Search and Examination Report for GB2118004.7, dated May 16, 2022, 6 pages.
European Search Report cited in EP 22212256.6, mailed May 11, 2023, 6 pages.

* cited by examiner

*Primary Examiner* — Flemming Saether
(74) *Attorney, Agent, or Firm* — Nixon & Vanderhye P.C.

(57) ABSTRACT

A barrel nut positioning frame for maintaining a barrel nut in a desired position in a bore of a component is disclosed having a frame body configured to receive a barrel nut therein, the frame body being adapted to fit, together with a received barrel nut, within a bore, and a bore engagement element configured to engage with a positioning feature in the bore so as to restrict movement of the frame within the bore.

15 Claims, 6 Drawing Sheets

BARREL NUT POSITIONING FRAME

CROSS RELATED APPLICATION

This application claims priority to United Kingdom Patent Application GB 2118004.7, filed 13 Dec. 2021, the entire contents of which is hereby incorporated by reference.

FIELD OF THE INVENTION

The present invention relates to a barrel nut positioning frame, a barrel nut assembly including the positioning frame and a barrel nut, an assembly including a component having the barrel nut assembly therein, and a method for assembling an aircraft assembly.

BACKGROUND OF THE INVENTION

Barrel nuts are used in a number of applications, particularly in the aerospace industry, where it is either undesirable for the tail end of a fastener to protrude through the surface of a component or where there are no accessible opposing surfaces between which a nut may be tightened onto the fastener.

Assembly generally involves placing the barrel nut into the bore of a component, such that a threaded through-hole of the barrel nut aligns with a fastener passing through the component. As rotation of the barrel nut relative to the longitudinal axis of the fastener is restricted by the fastener, the barrel nut is able to tighten onto the fastener.

However, whilst rotation of the barrel nut relative to the longitudinal axis of the fastener is restricted when attached to a fastener, when the barrel nut is not attached to a fastener the barrel nut is free to rotate relative to its longitudinal axis and to translate along the bore into which it is placed. This makes alignment of the barrel nut with the fastener difficult and time-consuming.

In addition, it is an ambition in the aerospace industry to improve build and assembly times for aircraft. One way to do this is to provide certain systems and sub-assemblies as self-contained modular units which can be more quickly and easily assembled to the major assembly. Barrel nuts are key enablers to allow for this modular assembly style. However, when a barrel nut is installed into a sub-assembly module which is then, for example, transported to another location for assembly to the major assembly, rotation and translation of the barrel nut can occur, leading to a need to re-align the barrel nut, or even loss of the barrel nut completely.

This uncertainty of barrel nut orientation also means that use of barrel nuts in automated assembly lines and automated assembly processed is unsuitable. For instance, if a barrel nut were to change orientation in an automated assembly process prior to a fastener or bolt being inserted therein, then it could cause significant delays while the line stops to allow for human intervention to re-orientate the barrel nut for the automated assembly process to continue.

GB2593687A describes a barrel nut retainer which can be used to retain a barrel nut inside a bore, and which comprises a feature that allows the barrel nut to be easily re-positioned to a desired rotational position.

SUMMARY OF THE INVENTION

According to a first aspect of the invention, there is provided a barrel nut positioning frame for maintaining a barrel nut in a desired position in a bore of a component, the frame comprising: a frame body configured to receive a barrel nut therein, the frame body being adapted to fit, together with a received barrel nut, within a bore; and a bore engagement element configured to engage with a positioning feature in the bore so as to restrict movement of the frame within the bore.

A further aspect of the invention provides a barrel nut assembly, comprising: the barrel nut positioning frame; and a barrel nut located in the frame body.

A further aspect of the invention provides an assembly, comprising: a component with a first bore and a second bore perpendicular to the first bore, the first bore having a positioning feature therein; the barrel nut assembly insertable into the first bore; and a fastener insertable into the second bore to threadingly engage with a threaded through-hole in the barrel nut.

A further aspect of the invention provides a method for assembling an aircraft assembly, comprising: providing a first component having a first bore and a second bore perpendicular to the first bore and intercepting the first bore, the first bore having a positioning feature formed therein; selecting a barrel nut positioning frame according to a previous aspect of the invention, wherein the barrel nut positioning frame is selected based on the positioning feature formed in the first bore; inserting a barrel nut into the barrel nut positioning frame to form a barrel nut assembly according to another previous aspect of the invention; and inserting the barrel nut assembly into the first bore such that the bore engagement element of the frame engages with the positioning feature in the first bore.

With such an arrangement it is possible to use the barrel nut positioning frame to ensure that a barrel nut is held in position within a bore. As such, when a fastener is to be fixed into the barrel nut during an assembly process, it is not necessary to check the position of the barrel nut and re-orientate it if needed before inserting the fastener. This allows for a much quicker, simpler and more efficient assembly process. In addition, it allows for the use of barrel nuts in an automated assembly process. Previously, barrel nuts have not been deemed suitable for automated assembly processes due to the uncertainty of barrel nut orientation.

Optionally, the bore engagement element may be configured to engage with a positioning feature in the bore so as to restrict movement of the frame within the bore for at least 5 degrees of freedom.

Optionally, the bore engagement element may be configured to engage with a positioning feature in the bore so as to substantially prevent rotation of the frame around a longitudinal axis of a barrel nut received therein.

Optionally, the bore engagement element may be configured to engage with a positioning feature in the bore so as to substantially prevent translation of the frame within the bore along a longitudinal axis of a barrel nut received therein.

Optionally, the frame body may comprise a spine extending longitudinally along a length of the barrel nut, and at least one circumferential prong extending at least partially around an outside circumference of the barrel nut.

Optionally, the frame body may comprise a barrel nut engagement element configured to engage with a feature in the barrel nut so as to restrict movement of the barrel nut within the frame.

Optionally, the barrel nut engagement element may be an inwardly-directing protrusion, and the feature in the barrel nut may be a recess formed in the outer surface of the barrel nut, and the inward-directing protrusion is received into the recess.

Optionally, the bore engagement element may comprise an outwardly directing protrusion.

Optionally, the outwardly-directing protrusion may be a convex formation formed in the frame, the convex formation extending radially outwards.

Optionally, the outwardly-directing protrusion may be a spring-biased hook that is biased radially outwards.

Optionally, the positioning feature in the bore may be a machined recess in the inner wall of the bore, and the outwardly directing protrusion may be configured to be received in the machined recess.

Optionally, the frame may comprise a leaf spring element configured to provide a biasing force against an inner wall of the bore.

Optionally, the outwardly directing protrusion of the bore engagement element of the frame may engage with the positioning feature in the first bore, so as to restrict movement of the barrel nut assembly within the bore.

Optionally, the assembly may be an aircraft assembly and the component may be an aircraft component, or the assembly may be an automotive assembly and the component may be an automotive component.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
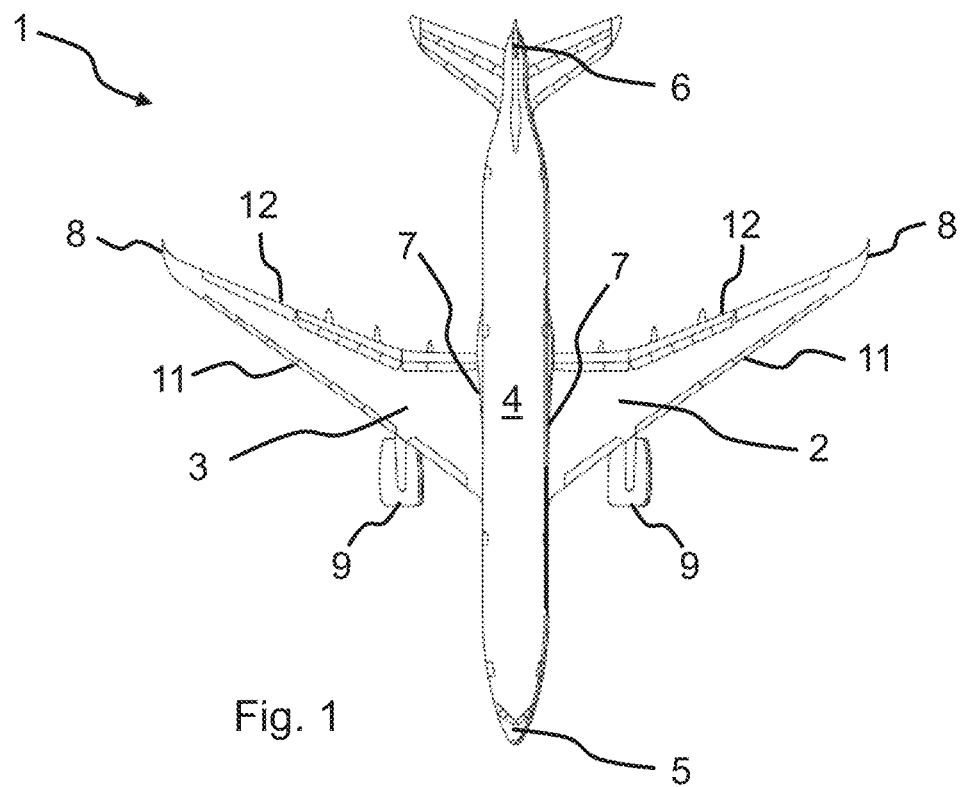
FIG. 1 shows a plan view of an aircraft.

FIG. 1 shows an aircraft 1 with port and starboard fixed wings 2, 3, and a fuselage 4 with a nose 5 and a tail 6. The aircraft 1 is a typical jet passenger transonic transport aircraft but the invention is applicable to a wide variety of fixed wing aircraft types, including commercial, military, passenger, cargo, jet, propeller, general aviation, etc. with any number of engines 9 attached to the wings or fuselage.

Each wing 2, 3 has a cantilevered structure with a length extending in a span-wise direction from a wing root 7 to a wing tip 8, the wing root 7 being joined to the fuselage 4. The wings 2, 3 are similar in construction so only the port wing 2 will be described in detail with reference to the following Figures.

In the following description, the term "front" refers to components towards a leading edge 11 of the wing, and the term "rear" refers to components towards a trailing edge 12 of the wing. The terms "forward" and "rearward" should be construed accordingly. The position of features may be construed relative to other features, for example a forward component may be disposed on a forward side of another component, but towards the rear of the vehicle. Similarly, the terms "upper" and "lower" refer to the position of features relative to other features and in accordance with a normal orientation of the aircraft 1.

Figure 2:
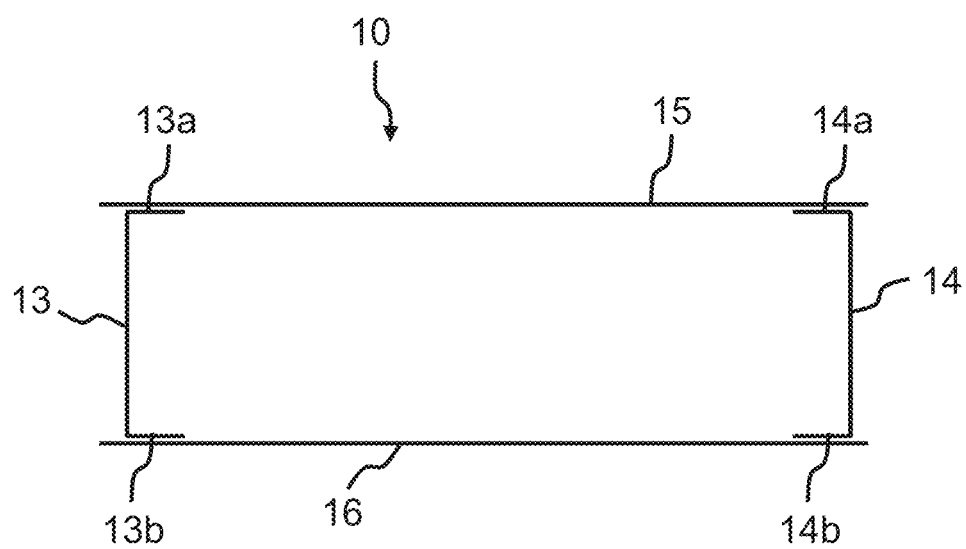
FIG. 2 shows a schematic view of a wing box 10 of an aircraft 1.

FIG. 2 shows a schematic view of a wing box 10 of the port wing 2 of an aircraft 1. The wing box 10 is a support structure arranged to support a significant proportion of the loads on the wing 2. The wing box 10 has a forward spar 13, an aft spar 14, an upper cover 15, and a lower cover 16 each extending substantially the entire length of the wing 2. The upper cover 15 and lower cover 16 have outer aerodynamic surfaces. The wing 3 also includes a leading edge structure (not shown) and a trailing edge structure (not shown) that are aerodynamically shaped to combine with the wing box 10 to form an aerofoil shaped body.

The forward spar 13 and aft spar 14 are 'C-shaped', each spar 13, 14 including inward facing flanges 13a, 13b, 14a, 14b that provide attachment portions for attaching the spars 13, 14 to the covers 14, 16. 'Inward facing' refers to the flanges extending towards the centre of the wing box 10, such that the flanges 13a, 13b of the forward spar 13 extend aft towards a trailing edge 12 of the wing 2 and the flanges 14a, 14b of the aft spar 14 extend forward towards a leading edge 11 of the wing 2.

In an alternative embodiment not shown in the figures, the forward spar 13 and aft spar 14 may include outward facing flanges that provide attachment portions for attaching the spars 13, 14 to the covers 15, 16. 'Outward facing' refers to the flanges extending away from the centre of the wing box 10, such that the flanges of the forward spar 13 extend forwards towards a leading edge 11 of the wing 2 and the flanges of the aft spar 14 extend aft towards a trailing edge 12 of the wing 2.

Figure 3:
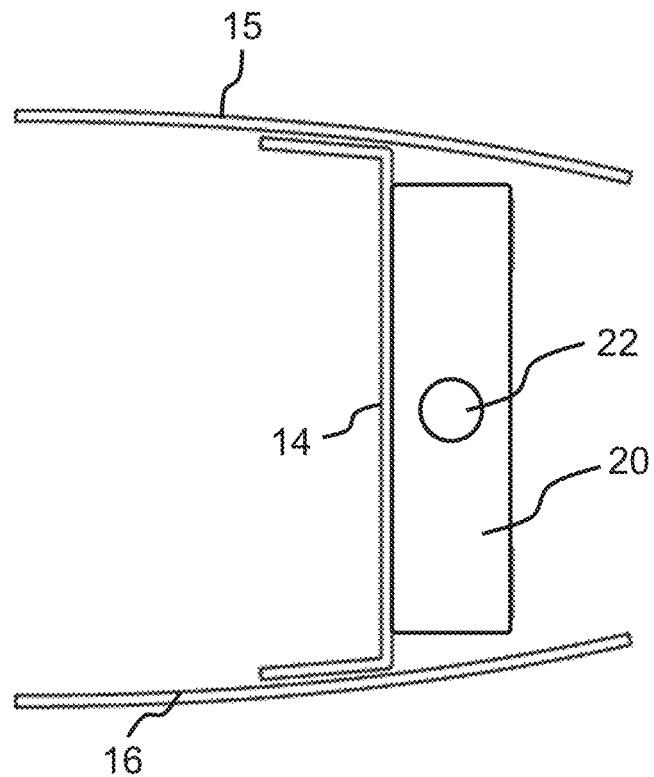
FIG. 3 shows an aft section of a wing box having an aft spar with an attachment bracket.

FIG. 3 shows a schematic of an aft section of the wing box 10, in which an attachment bracket 20 is connected to the rear spar 14. The attachment bracket enables pre-assembled modules to be fixed to the rear spar 14 during assembly of the wing 2. This modular assembly allows for a much quicker and simpler assembly than traditional methods.

Figure 4:
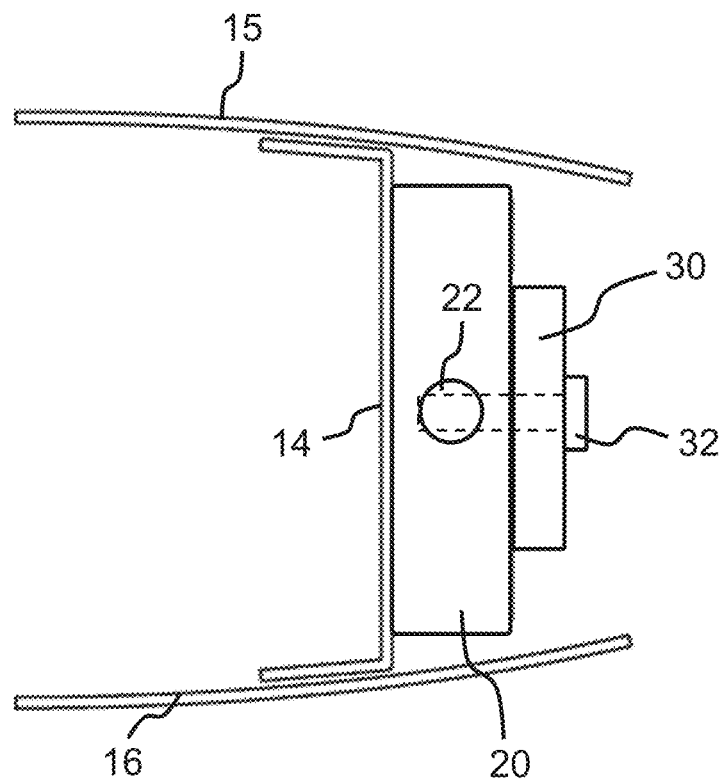
FIG. 4 shows the aft section of a wing box of FIG. 3 with a component fastened to the attachment bracket.

FIG. 4 shows a sub-assembly module 30, e.g. an aircraft wing trailing edge system module, coupled to the attachment bracket 20. The connection between the sub-assembly module 30 and the attachment bracket 20 is achieved via a captive nut solution. A fastener 32 in the form of a bolt extends through the sub-assembly module 30 and into a barrel nut (not shown) held captive within a bore 22 of the attachment bracket 20.

A barrel nut and fastener combination is required due to the limited access to the upper rearward portion of the wing box 10, and in particular the lack of opposing surfaces upon which to tighten a nut onto the fastener 32.

The connection is formed by inserting the barrel nut into the bore 22 of the attachment bracket 20, inserting the fastener 32 through a bore in the sub-assembly module 30 and attachment bracket 20, wherein the fastener bore connects with and is perpendicular to the bore 22 into which the barrel nut is inserted. In this manner, the fastener 32 can be inserted into a threaded through-hole of the barrel nut. As rotation of the barrel nut relative to the longitudinal axis of the fastener is restricted by the fastener, when the fastener is inserted through the barrel nut, the barrel nut is able to tighten onto the fastener.

However, whilst rotation of the barrel nut relative to the longitudinal axis of the fastener is restricted when attached to a fastener, when the barrel nut is not attached to a fastener, a standard barrel nut would be free to rotate about its own longitudinal axis and to translate along the bore into which it is placed. This would make alignment of the barrel nut with the fastener difficult and time-consuming. The restricted access at the aft portion of the wing box 10 shown in FIG. 4 also means that manipulation of the barrel nut within the bore is made even more challenging.

There is also a risk that a standard barrel nut would slide out of the bore and be lost, which is a particular concern with aircraft assemblies.

To address these problems, a barrel nut assembly can be used which comprises a barrel nut which is located inside a barrel nut positioning frame. In addition, a positioning feature is provided in the bore 22. The barrel nut assembly will be described in more detail below, but the frame enables the barrel nut to maintain a desired position within the bore 22 by engaging with the positioning feature in the bore 22.

Figure 5:
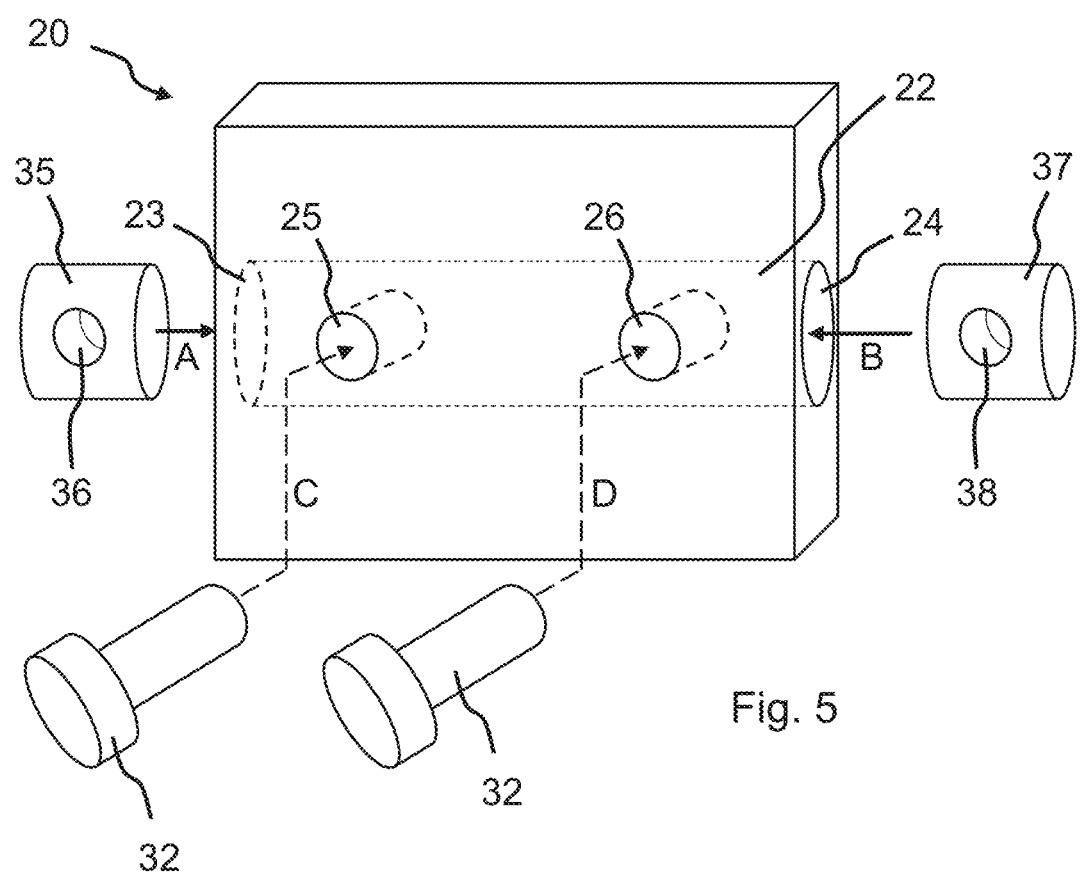
FIG. 5 shows a perspective view of a schematic representation of an attachment bracket.

A perspective view of a schematic representation of the attachment bracket 20 is shown in FIG. 5. The attachment bracket 20 has a first bore, bore 22 which extends through the attachment bracket 20. The attachment bracket 20 also has a second bore 25 and a third bore 26. The second and third bores 25, 26 extend through the body of the attachment bracket perpendicular to the first bore 22, and intercept the first bore 22.

Two barrel nut assemblies 35, 37 are inserted into the bore 22, barrel nut assembly 35 being inserted through bore aperture 23, and barrel nut assembly 37 being inserted through bore aperture 24 as indicated by arrows A and B. Barrel nut assembly 35 is inserted into the bore 22 until its threaded through-hole 36 is aligned with the second bore 25 in the attachment bracket. Similarly, barrel nut assembly 37 is inserted into the bore 22 until its threaded through-hole 38 is aligned with the third bore 26 in the attachment bracket.

When each barrel nut assembly 35, 37 is in place, a bore engagement element (not shown) of each barrel nut assembly engages with a positioning feature (not shown) in the first bore 22. This restricts movement of each barrel nut assembly 35, 37 within the bore 22, and ensures that the threaded through-holes 36, 38 remain aligned with the second and third bores 25, 26.

Fasteners 32 can then be inserted through the second and third bores 25, 26, as indicated by dotted-line arrows C and D, to threadingly engage with the threaded through-holes 36, 38 in the barrel nut assemblies 35, 37.

In FIG. 5 the bore 22 extends through the entire body of the attachment bracket 20 in the embodiment shown. However, it will be appreciated that in alternative embodiments an attachment bracket may comprise a number of individual bores which do not extend fully through the body of the bracket.

Figure 6A:
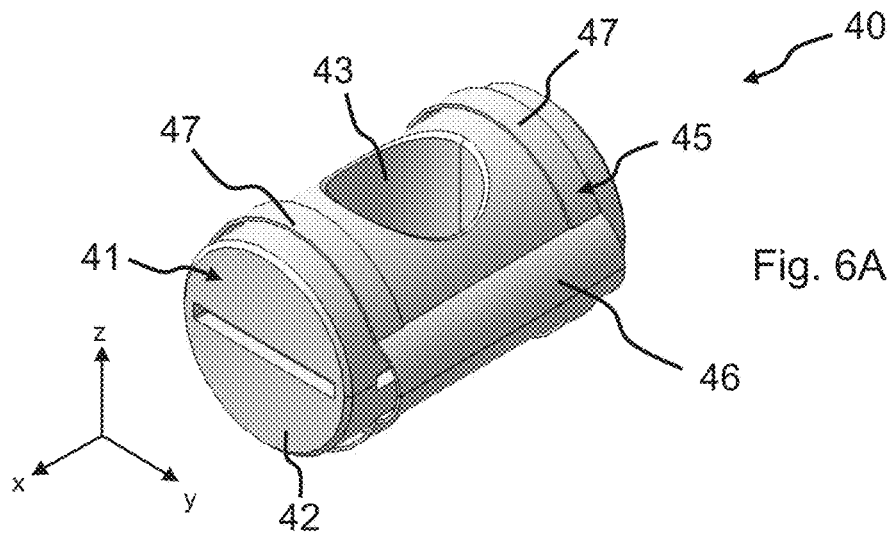
FIGS. 6A and 6B show perspective views of a first embodiment of a barrel nut assembly.
Figure 6B:
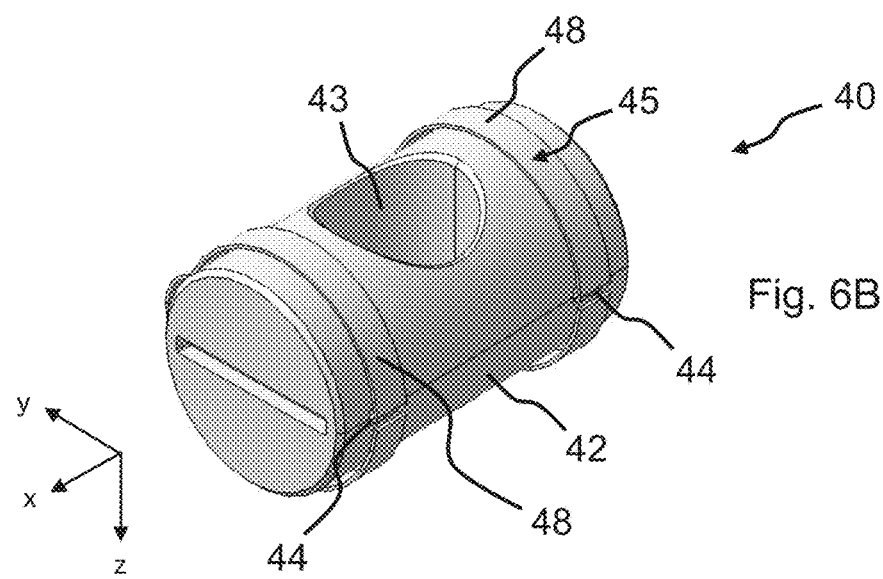

FIGS. 6A and 6B show a first embodiment of a barrel nut assembly 40. FIG. 6B shows the barrel nut assembly of FIG. 6A rotated 180° around the x-axis shown in the Cartesian coordinate system x, y, z axes.

The relative orientations of the barrel nut assemblies described herein can be more easily understood using the Cartesian coordinate system x, y, z axes which are provided where necessary in the Figures for reference purposes only.

The barrel nut assembly 40 comprises a barrel nut 41 and a barrel nut positioning frame 45. The barrel nut 41 is a fairly typical barrel nut comprising a generally cylindrical body 42 and a threaded through hole 43. The threads of the threaded through-hole 43 are not shown in the Figures for the sake of clarity.

The barrel nut positioning frame 45 comprises a frame body which is configured to receive the barrel nut 41 therein. The frame body comprises a spine 46 extending longitudinally along the length of the barrel nut 41. The frame body also comprises two pairs of circumferential prongs 47, 48 extending from the spine 46. The circumferential prongs extend around the outside circumference of the barrel nut 41 to enclose it within the positioning frame 45.

The positioning frame 45 also comprises a barrel nut engagement element in the form of inwardly-directing protrusions 49 located at the end of prongs 48. The inwardly-directing protrusions are configured to engage with small recesses 44 formed in the barrel nut 41, such that movement of the barrel nut 41 within the positioning frame 45 is restricted.

The spine 46 of the positioning frame 45 has an outwardly convex profile, such that the spine 46 forms an outwardly-directing protrusion. This enables the spine 46 to engage with a positioning feature formed in a bore of a component, as will be described below in reference to FIG. 6C.

Figure 6C:
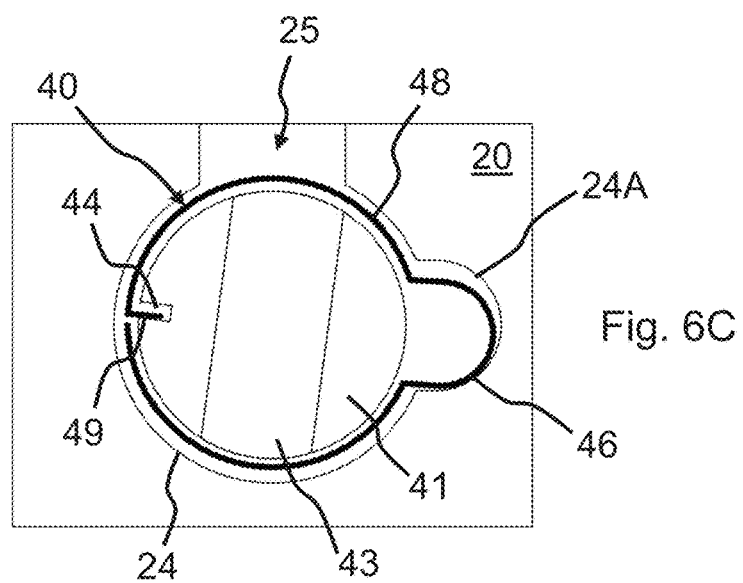
FIG. 6C is a cross section through the barrel nut assembly of FIGS. 6A and 6B in position inside a component.

FIG. 6C shows a representation of a cross section through the barrel nut assembly 40 in position inside a component, such as the attachment bracket 20 of FIG. 5. The same reference numbers for equivalent features shown in FIG. 5 will therefore be used. The barrel nut assembly 40 is inside the bore 24 of the attachment bracket 20. The bore 24 is provided with a positioning feature in the form of a recess 24A formed in the wall of the bore 24 and which extends along the length of the bore 24. The barrel nut assembly 40 is inserted into the bore 24 such that the outwardly-directing protrusion of the spine 46 is received inside the recess 24A. As such, the outwardly-directing protrusion of the spine 46 engages with the recess 24A in order to prevent the barrel nut assembly 40 from rotating about its longitudinal axis. This ensures that the threaded through-hole 43 of the barrel nut 41 remains aligned with the second bore 25 of the attachment bracket 20.

As such, when the barrel nut assembly 40 is assembled into the bore 24, movement of the positioning frame 45, and therefore the entire barrel nut assembly 40, is restricted in five of its six degrees of freedom. The remaining degree of freedom left for the barrel nut assembly is that it is able to translate through the bore along the longitudinal axis (x-axis) of the barrel nut.

Figure 7A:
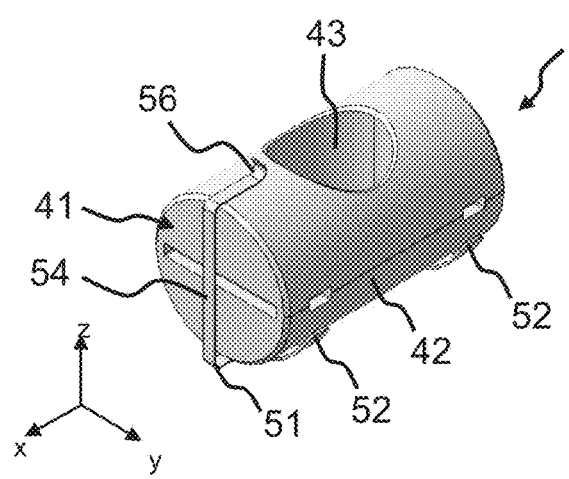
FIGS. 7A and 7B show perspective views of a second embodiment of a barrel nut assembly.
Figure 7B:
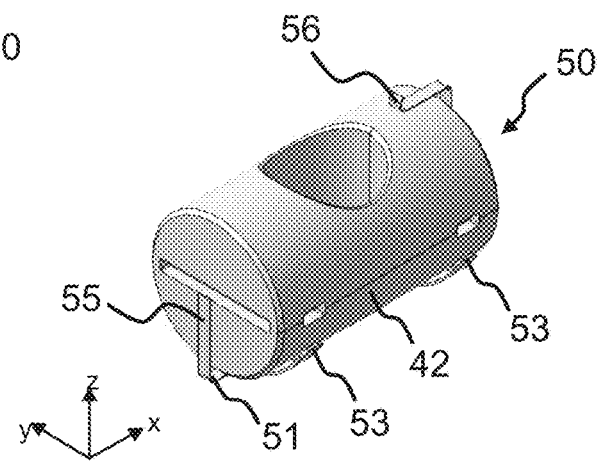

FIGS. 7A and 7B show a second embodiment of a barrel nut assembly 50. The barrel nut assembly 50 comprises the same barrel nut 41 described in the embodiment of FIGS. 6A and 6B and a barrel nut positioning frame 51.

The barrel nut positioning frame 51 comprises a frame body which is configured to receive the barrel nut 41 therein. The frame body comprises a spine (hidden from view underneath the barrel nut 41) extending longitudinally along the length of the barrel nut 41. The frame body also comprises two pairs of circumferential prongs 52, 53 extending from the spine. The circumferential prongs extend partially around the outside circumference of the barrel nut 41 to help retain it within the positioning frame 51.

The positioning frame 51 further comprises a head end 54 and a tail end 55. Unlike the barrel nut assembly of FIGS. 6A and 6B, the barrel nut assembly of FIGS. 7A and 7B does not comprise an engagement between inwardly-directing protrusions of the frame and recessed in the barrel nut 41. Instead, a frictional engagement between the frame 51 and the barrel nut 41 is sufficient to restrict movement of the barrel nut 41 within the positioning frame 51 and maintain correct orientation.

The positioning frame 51 further comprises a spring-biased hook 56 attached to the head end 54. The spring-biased hook 56 forms an outwardly-directing protrusion which can engage with a positioning feature formed in a bore of a component, as will be described below in reference to FIGS. 7E and 7F.

Figure 7C:
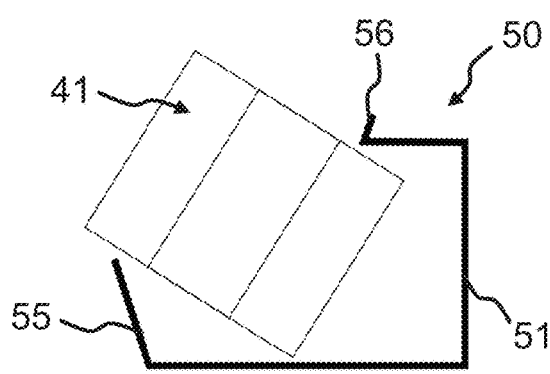
FIG. 7C is a cross section through the barrel nut assembly of FIGS. 7A and 7B during assembly of the barrel nut assembly.

FIG. 7C shows a representation of a cross section through the barrel nut assembly 50 during assembly of the barrel nut assembly itself. The frame 51 is formed of an elastic material such as metal or a plastic material. To insert the barrel nut 41 into the frame 51, the frame is simply elastically deformed allowing the barrel nut 41 to be inserted into it. In particular, FIG. 7C shows the tail end 55 of the frame 51 being deformed.

Figure 7D:
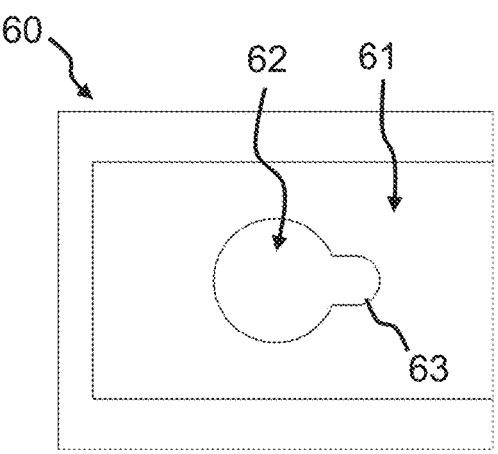
FIG. 7D shows a cross section through a bore in a component.

FIG. 7D shows a cross section through a bore 61 in a component 60. The bore 61 is the bore into which the barrel nut assembly is to be inserted. The bore 62 is the bore through which a fastener or bolt can be inserted in order to fasten to a barrel nut. The bore 61 comprises a positioning feature in the forms of a recess 63 in the inner wall of the bore 61. This recess 63 can be machined easily by extending part of the opening of the second bore 62 to the point that the intersection with the first bore 61 is reached.

Figure 7E:
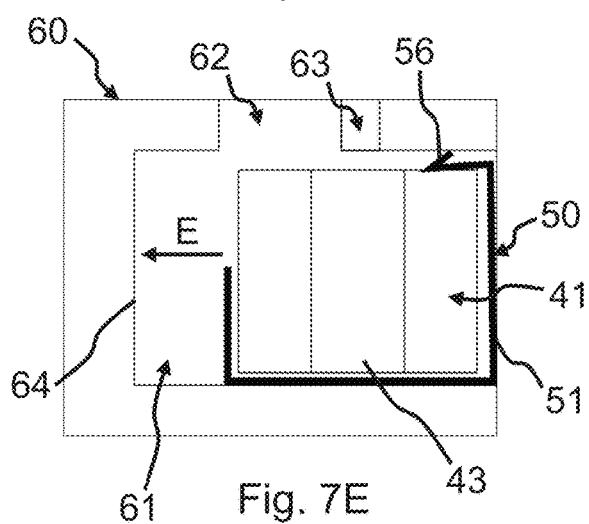
FIGS. 7E and 7F shows different stages during assembly of the barrel nut assembly of FIGS. 7A and 7B into the component of 7D.

FIG. 7E shows the component 60 during insertion of the barrel nut assembly 50 into the bore 61. Movement of the barrel nut assembly 50 into the bore 61 is indicated by arrow E. The spring-biased hook 56 is biased into a flattened configuration to allow the barrel nut assembly 50 to fin into the bore 61. The bore 61 does not extend as a through-hole through the whole component 60. Instead, the depth of the bore is controlled such that when the barrel nut assembly 50 abuts against the end 64 of the bore 61, the threaded through-hole 43 of the barrel nut 41 is aligned with the second bore 62 in the component 60.

Figure 7F:
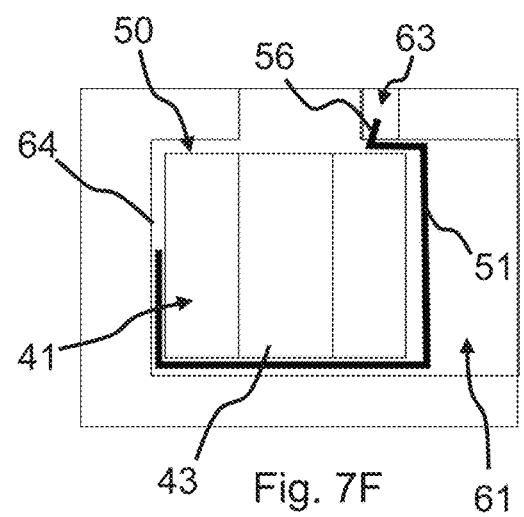

FIG. 7F shows the barrel nut assembly 50 abutting against the end 64 of the bore 61. At this position, the spring-biased hook 56 has reached the recess 63 and therefore the biasing force in the hook 56 has caused it to revert to the protruding configuration such that it protrudes into, and engages with the recess 63. In this position, if the barrel nut assembly 50 attempts to move, for example by translation along or rotation around the longitudinal axis (x-axis), the spring-biased hook 56 will come into contact with the sides of the recess 63, and prevent significant movement. The engagement of the spring-biased hook 56 in the recess 63 therefore restricts movement of the positioning frame 51, and therefore the entire barrel nut assembly 50, in all six degrees of freedom of the barrel nut assembly 50.

The embodiment shown in FIGS. 7A-F requires fairly strict control over the size of the positioning frame 51 and also over the depth of the bore 61. An alternative embodiment is shown in FIGS. 8A and 8B which allows for a larger error margin in the size of the bore, and also in the size of the positioning frame.

Figure 8A:
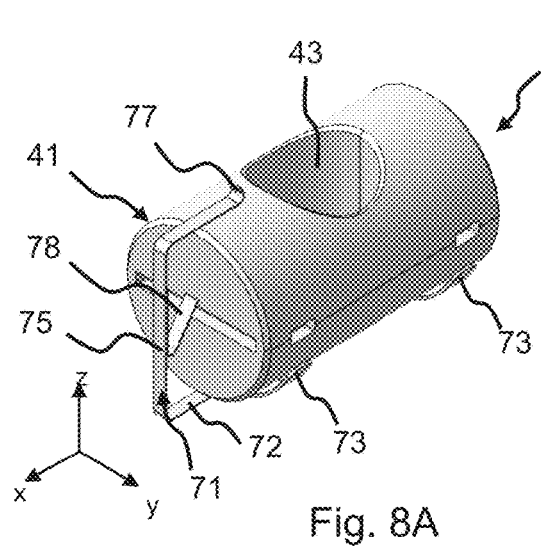
FIGS. 8A and 8B show perspective views of a third embodiment of a barrel nut assembly.
Figure 8B:
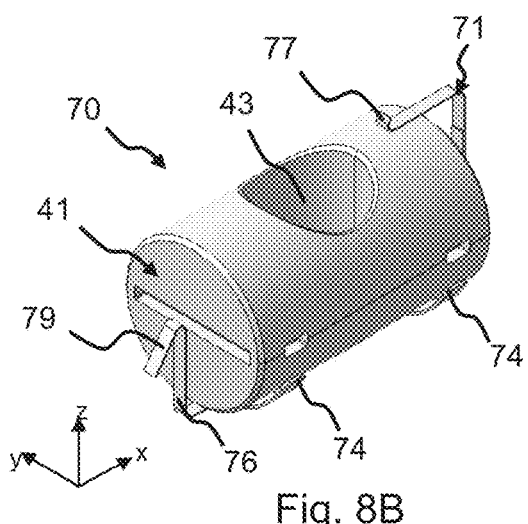

FIGS. 8A & 8B show a third embodiment of a barrel nut assembly 70. The barrel nut assembly 70 comprises the same barrel nut 41 described in the previous embodiments and a barrel nut positioning frame 71.

The barrel nut positioning frame 71 comprises a frame body which is configured to receive the barrel nut 41 therein. The frame body comprises a spine 72 extending longitudinally along the length of the barrel nut 41. The spine 72 of this embodiment is longer then the length of the barrel nut 41 such that the frame extends beyond the length of the barrel nut 41. The frame body also comprises two pairs of circumferential prongs 73, 74 extending from the spine. The circumferential prongs extend partially around the outside circumference of the barrel nut 41 to help retain it within the positioning frame 71.

The positioning frame 71 further comprises a head end 75 and a tail end 76. As with the embodiment described in FIGS. 7A and 7B, a frictional engagement between the frame 71 and the barrel nut 41 is sufficient to restrict movement of the barrel nut 41 within the positioning frame 71 and maintain correct orientation.

The positioning frame 71 comprises a spring-biased hook 77 attached to the head end 75. The spring-biased hook 77 forms an outwardly-directing protrusion which can engage with a positioning feature formed in a bore of a component.

The positioning frame 71 further comprises a first leaf spring element 78 at the head end 75. The first leaf spring element 78 extends inwards from the head end 75 towards the barrel nut 41. The first leaf spring element 78 therefore provides a biasing force against the barrel nut 41 such that it is urged into abutment with the tail end 76.

The positioning frame 71 further comprises a second leaf spring element 79 at the tail end 76. The second leaf spring element 79 extends outwards from the tail end 76 towards the end face of a bore in which the barrel nut assembly 70 can be located. The second leaf spring element 79 therefore allows for a margin of error in manufacturing tolerances when a bore is formed in a component that the barrel nut 70 will be installed in.

Figure 9A:
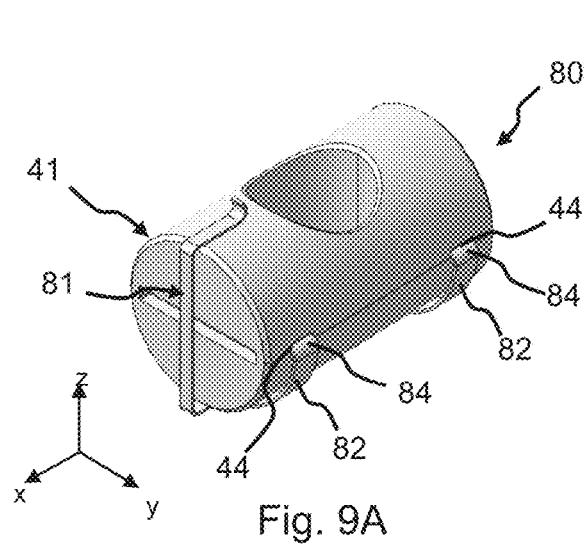
FIGS. 9A and 9B show perspective views of a fourth embodiment of a barrel nut assembly.
Figure 9B:
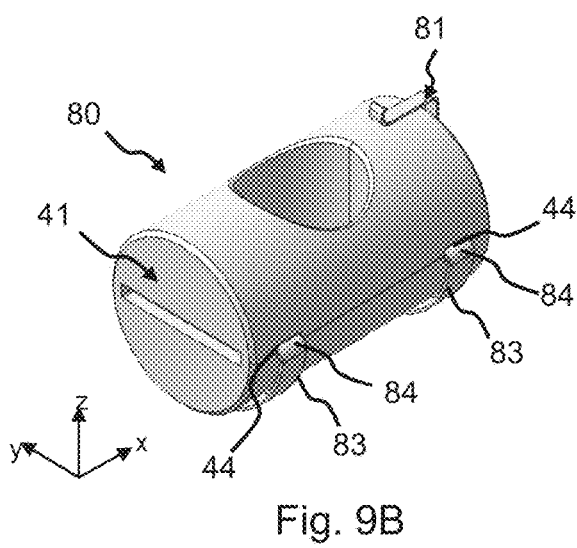

FIGS. 9A and 9B show a fourth embodiment of a barrel nut assembly 80. The barrel nut assembly 80 comprises the same barrel nut 41 described in the previous embodiments and a barrel nut positioning frame 81. The barrel nut positioning frame 81 is similar to that described in FIGS. 7A and 7B, and only the differences shall be focused on here, equivalent features found in previously described embodiments shall not be discussed for the sake of conciseness.

The positioning frame 81 does not have a tail end as found in previous embodiments. The two pairs of circumferential prongs 82, 83 extending from the spine extend partially around the outside circumference of the barrel nut 41 to help retain it within the positioning frame 71, and at the distal end of the prongs 82, 83 from the spine, each of the prongs is provided with a barrel nut engagement element in the form of an inwardly-directing protrusion 84. The inwardly-directing protrusions 84 are configured to engage with small recesses 44 formed in the barrel nut 41, such the barrel nut 41 is retained within the positioning frame 81, and that relative movement between the two is restricted.

Figure 10A:
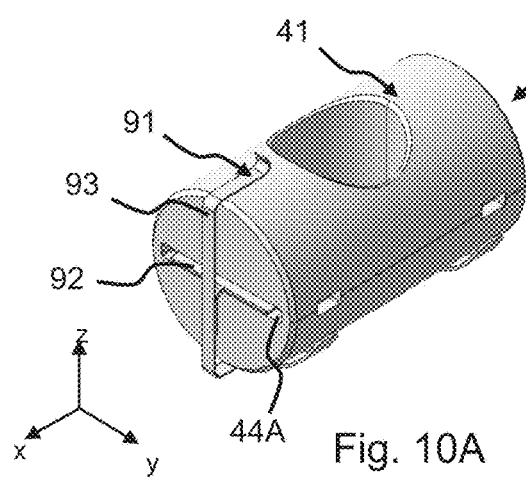
FIGS. 10A and 10B show perspective views of a second embodiment of a barrel nut assembly.
Figure 10B:
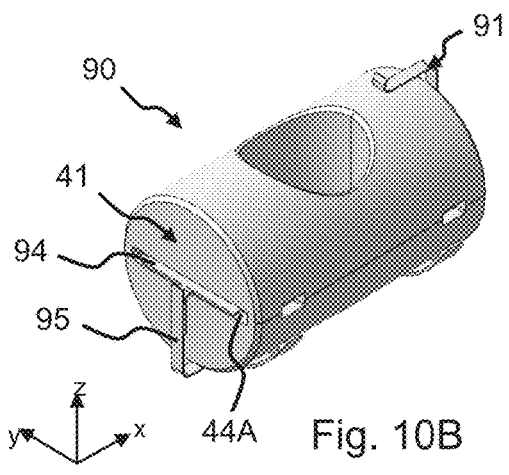

FIGS. 10A and 10B show a fifth embodiment of a barrel nut assembly 90. The barrel nut assembly 90 comprises the same barrel nut 41 described in the previous embodiments and a barrel nut positioning frame 91. The barrel nut positioning frame 91 is similar to that described in FIGS. 7A and 7B, and only the differences shall be focused on here, equivalent features found in previously described embodiments shall not be discussed for the sake of conciseness.

The barrel nut positioning frame 91 has a bar 92 that protrudes inwardly from the head end 93 towards the barrel nut 41. The bar 92 engages with a screwdriver engagement slot 44A that is formed in one end of the barrel nut 41. The barrel nut positioning frame 91 also has a bar 94 that protrudes inwardly from the tail end 95 towards the barrel nut 41. The bar 94 engages with a second screwdriver engagement slot 44A that is formed in the other end of the barrel nut 41. As such the barrel nut 41 is retained within the positioning frame 91, and that relative movement between the two is restricted.

It will be clear to the skilled person that the examples described above may be adjusted in various ways, and features of some embodiments may be combined with other embodiments depending on the application and requirements.

In alternative examples, the recess 61 may instead be suitable for engaging with a different shaped tool, or may be a protrusion providing a surface to which a tool (or user) can grip the retainer 50.

The positioning frame is described as being formed from metal or plastic. For instance the positioning frame may be formed from ABS, or from other plastics materials such as Polylactic Acid (PLA) and polycarbonate. The positioning frame may also be formed of other materials, such as stainless steel, nickel alloys, aluminium, or any other suitable metal.

In some examples, some parts and elements are described as being formed as a leaf spring, however they may instead use a compression spring component and still provide the same functionality.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A barrel nut assembly, comprising:
   a barrel nut; and
   a barrel nut positioning frame for maintaining the barrel nut in a desired position in a bore of a component, the frame comprising:
      a frame body configured to receive a barrel nut therein, the frame body being adapted to fit, together with the received barrel nut, within a bore; and
      a bore engagement element configured to engage with a positioning feature in the bore so as to restrict movement of the frame within the bore,
   wherein the frame body comprises a pair of circumferential prongs extending at least partially around an outside circumference of the barrel nut, and
   wherein the frame body comprises a spine extending longitudinally along a length of the barrel nut between the two pairs of circumferential prongs.

2. The barrel nut assembly according to claim 1, wherein the bore engagement element is configured to engage with a positioning feature in the bore so as to restrict movement of the frame within the bore for at least 5 degrees of freedom.

3. The barrel nut assembly according to claim 1, wherein the bore engagement element is configured to engage with a positioning feature in the bore so as to substantially prevent rotation of the frame around a longitudinal axis of a barrel nut received therein.

4. The barrel nut assembly according to claim 1, wherein the bore engagement element is configured to engage with a positioning feature in the bore so as to substantially prevent translation of the frame within the bore along a longitudinal axis of a barrel nut received therein.

5. The barrel nut assembly according to claim 1, wherein the frame body comprises a barrel nut engagement element configured to engage with a feature in the barrel nut so as to restrict movement of the barrel nut within the frame.

6. The barrel nut assembly according to claim 5, wherein the barrel nut engagement element is an inwardly-directing protrusion, and the feature in the barrel nut is a recess formed in the outer surface of the barrel nut, and the inward-directing protrusion is received into the recess.

7. The barrel nut assembly according to claim 1, wherein the bore engagement element comprises an outwardly directing protrusion.

8. The barrel nut assembly according to claim 7, wherein the outwardly-directing protrusion is a convex formation in the frame, the convex formation extending radially outwards.

9. The barrel nut assembly according to claim 7, wherein the outwardly-directing protrusion is a spring-biased hook that is biased radially outwards.

10. The barrel nut assembly according to claim 7, wherein the positioning feature in the bore is a machined recess in the inner wall of the bore, and the outwardly directing protrusion is configured to be received in the machined recess.

11. The barrel nut assembly according to claim 1, wherein the frame comprises a leaf spring element configured to provide a biasing force against an inner wall of the bore.

12. An assembly, comprising:
   a component with a first bore and a second bore perpendicular to the first bore, the first bore having a positioning feature therein;
   the barrel nut assembly of claim 1 insertable into the first bore; and
   a fastener insertable into the second bore to threadingly engage with a threaded through-hole in the barrel nut.

13. An assembly according to claim 12,
   wherein the outwardly directing protrusion of the bore engagement element of the frame engages with the positioning feature in the first bore, so as to restrict movement of the barrel nut assembly within the bore.

14. An assembly according to claim 12, wherein the assembly is an aircraft assembly and the component is an aircraft component, or wherein the assembly is an automotive assembly and the component is an automotive component.

15. A method for assembling an aircraft assembly, comprising:
   providing a first component having a first bore and a second bore perpendicular to the first bore and intercepting the first bore, the first bore having a positioning feature formed therein;
   selecting a barrel nut positioning frame comprising a frame body configured to receive a barrel nut therein, the frame body being adapted to fit, together with a received barrel nut, within a bore, and a bore engagement element configured to engage with a positioning feature in the bore so as to restrict movement of the frame within the bore, wherein the barrel nut positioning frame is selected based on the positioning feature formed in the first bore;
   inserting a barrel nut into the barrel nut positioning frame to form a barrel nut assembly according to claim 1; and
   inserting the barrel nut assembly into the first bore such that the bore engagement element of the frame engages with the positioning feature in the first bore.

* * * * *